United States Patent
Kristjansson et al.

(10) Patent No.: US 10,778,013 B2
(45) Date of Patent: Sep. 15, 2020

(54) DISTRIBUTED BATTERY ARCHITECTURE

(71) Applicant: Microsoft Technology Licensing, LLC, Redmond, WA (US)

(72) Inventors: Stefan Jon Kristjansson, Kirkland, WA (US); Algird M. Gudatis, Fall City, WA (US); Laurentiu Olariu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/867,279

(22) Filed: Jan. 10, 2018

(65) Prior Publication Data

US 2019/0214831 A1    Jul. 11, 2019

(51) Int. Cl.
*H02J 7/00* (2006.01)
*G06F 1/26* (2006.01)
*H02J 7/34* (2006.01)

(52) U.S. Cl.
CPC ............ *H02J 7/0016* (2013.01); *G06F 1/263* (2013.01); *H02J 7/0013* (2013.01); *H02J 7/0014* (2013.01); *H02J 7/0072* (2013.01); *H02J 7/34* (2013.01)

(58) Field of Classification Search
CPC ...... H02J 7/0072; H02J 7/0054; H02J 7/0024; H01M 10/44
USPC .......................... 320/103, 116–119, 126, 134
See application file for complete search history.

(56) References Cited

U.S. PATENT DOCUMENTS

| | | | |
|---|---|---|---|
| 5,486,749 A | 1/1996 | Brainard | |
| 6,462,511 B1 | 10/2002 | Kwok | |
| 6,586,909 B1 | 7/2003 | Trepka | |
| 6,768,637 B1 * | 7/2004 | Amemiya | G06F 1/1632 361/679.27 |
| 7,414,381 B2 | 8/2008 | Popescu-Stanesti et al. | |
| 7,518,338 B2 | 4/2009 | Wang et al. | |
| 8,659,182 B2 | 2/2014 | Ichikawa et al. | |
| 8,674,658 B2 | 3/2014 | Wang et al. | |
| 2005/0212489 A1 | 9/2005 | Denning et al. | |
| 2006/0066286 A1 | 3/2006 | Yokota et al. | |
| 2007/0247107 A1 | 10/2007 | Wang et al. | |
| 2011/0100735 A1 | 5/2011 | Flett | |
| 2012/0038320 A1 | 2/2012 | Kabasawa et al. | |
| 2012/0153899 A1 * | 6/2012 | Marschalkowski | H02J 7/0018 320/118 |
| 2013/0335028 A1 | 12/2013 | Choi | |
| 2014/0203780 A1 * | 7/2014 | Hu | H02J 7/0014 320/112 |
| 2015/0207339 A1 | 7/2015 | Hamburgen et al. | |

(Continued)

OTHER PUBLICATIONS

"How to Charge Lead Acid Marine and Rv Batteries in Parallel", Retrieved From <<https://web.archive.org/web/20170316213447/http:/www.impactbattery.com/blog/tutorials/how-to-charge-marine-and-rv-batteries-in-parallel/ >>, Mar. 16, 2017, 4 pages.

(Continued)

*Primary Examiner* — Zixuan Zhou
(74) *Attorney, Agent, or Firm* — Holzer Patel Drennan

(57) ABSTRACT

The herein described technology provides a system with multiple batteries connected in parallel and having disparate charge and/or discharge characteristics. When a voltage source is coupled to a shared charging node, the multiple batteries are simultaneously charged through the shared charging node.

18 Claims, 7 Drawing Sheets

(56) References Cited

U.S. PATENT DOCUMENTS

2015/0270801 A1* 9/2015 Kessler ............... H02J 7/0024
                                                         318/139
2017/0324256 A1  11/2017 Mcmorrow et al.
2019/0214837 A1   7/2019 Kristjansson

OTHER PUBLICATIONS

"How-To: Parallel Charging", Retreived From <<https://web.archive.org/web/20120108063234/http:/www.tjinguytech.com/charging-how-tos/parallel-charging>>, Jan. 8, 2012, 9 pages.

"International Search Report and Written Opinion Issued in PCT Application No. PCT/US18/066342", dated Mar. 11, 2019, 10 Pages.

"International Search Report and Written Opinion Issued in PCT Application No. PCT/US18/066341", dated Mar. 11, 2019, 11 Pages.

Non Final Office Action Issued in U.S. Appl. No. 15/867,028, dated May 16, 2019, 12 Pages.

"Final Office Action Issued in U.S. Appl. No. 15/867,028", dated Oct. 4, 2019, 13 Pages.

"Non Final Office Action Issued in U.S. Appl. No. 15/867,028", dated Mar. 12, 2020, 14 Pages.

* cited by examiner

DISTRIBUTED BATTERY ARCHITECTURE

BACKGROUND

Impedance and thus electrical loss increase in proportion to distance between a battery and a load supported by the battery. In applications where main system loads are at a greater distance from the battery than desirable due to physical layout and placement, the source impedance may be too high to supply adequate power during heavy loads, leading to a high risk of system brownout.

To provide increased battery placement flexibility, some systems include significant bulk capacitors near loads that exhibit high load transients, effectively decreasing high transient current draw from the battery by supplying a lower impedance source and thereby reducing the voltage drop associated with the higher impedance of the battery source. However, bulk capacitors consume already-limited circuit board surface area and add to system manufacturing costs. Additionally, depending on the load profile, achieving a target energy storage and impedance profile may limit peak loading below target levels if reliant on bulk capacitors. Other systems increase battery placement options and run-time capacity by including multiple batteries. If batteries have identical charge characteristics (e.g., total capacity and relative charge state at any given point in time), the batteries may be connected in series (to increase voltage level) or in parallel (to keep same the voltage level but increase total capacity) and permitted to charge and discharge at substantially identical rates. If, however, selected batteries have disparate charge and discharge characteristics, battery life preservation may depend on regular operation of the batteries at different charge and/or discharge rates, leading to a number of design challenges.

SUMMARY

A battery circuit disclosed herein includes multiple batteries having disparate charge characteristics and connected in parallel to a voltage source through a shared charging node that simultaneously charges each of the multiple batteries.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

When batteries connected in parallel have disparate charge and discharge characteristics, battery life preservation may depend on the regular operation of the batteries at different charge and/or discharge rates. As a result, some systems isolate batteries with disparate charge characteristics during charging. For example, two batteries may be charged sequentially one at a time from a single charger, or charged in parallel with separate chargers. Sequentially charging batteries is time-consuming and there exists a risk that a sudden power loss may leave different batteries with different states of charge, causing one battery to back-charge into another at an unsafe rate unless in a product with well-defined and controlled charging time and behavior. In contrast to sequential charging, parallel charging with different chargers is costly to implement and may lead to complications in balancing charge when the batteries are reconnected after charging, or require all batteries charge at the same rate which is inefficient and increases charge time.

In addition to the above-described charging challenges, batteries with disparate characteristics may naturally discharge at different rates, leading to unequal states of charge throughout operation. If two electrically-coupled batteries have unequal states of charge at any time, due to discharge or swapping batteries (e.g., 20% charged and 70% charged, for example), the battery with the higher state of charge may try to discharge into the other battery in an uncontrolled manner. If this discharge is too high due to battery voltage difference and resistance internal to the packs and between the packs, current protection may be tripped and/or the life of the battery receiving the discharge may be degraded.

The herein disclosed technology provides a distributed battery architecture for parallel charging and discharging of multiple batteries with disparate charge characteristics. As used herein, two batteries are referred to as "disparate" or "having disparate charge characteristics" when characterized by charge profiles that are substantially non-identical, such as when the batteries have different capacities, and/or physical characteristics that may lead to different relative states of charge when simultaneously integrated within a same electronic device. For example, two batteries have disparate charge characteristics if they have different capacities, are at different states of charge, and/or are physically located in proximity to loads (and thus impedance) so as to discharge at different rates (thereby leading to different states of charge).

Figure 1:
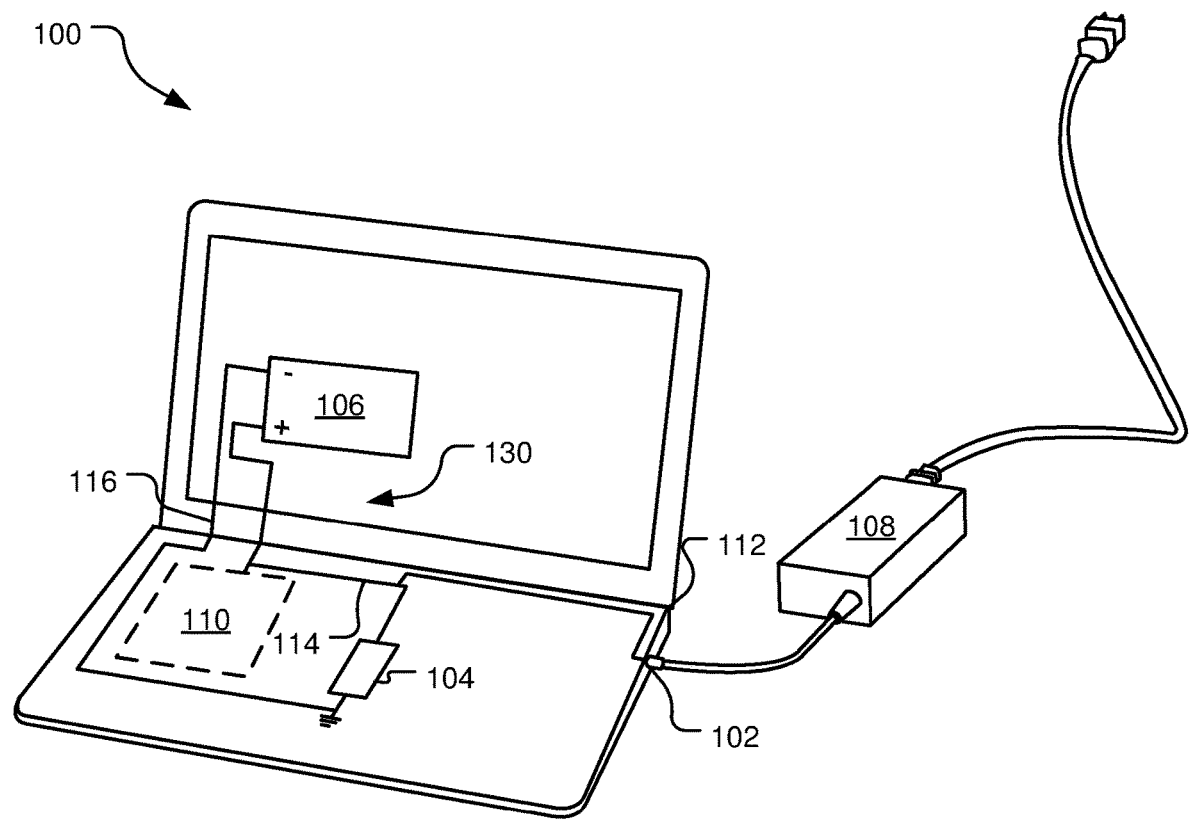
FIG. 1 illustrates an example electronic device with a distributed battery architecture that supports parallel charging and discharging of batteries with disparate charge characteristics.

FIG. 1 illustrates an example electronic device 100 with a distributed battery architecture that supports parallel charging and discharging of batteries with disparate charge characteristics. The electronic device 100 is shown to be a foldable mobile computing device in FIG. 1, but may, in other implementations, be any battery-powered electronic device. The electronic device 100 includes system electronics 110 (e.g., a processor, memory, display, speakers, wireless circuitry) supported by current from a battery circuit 130 including two disparate batteries (a first battery 104 and a second battery 106) electrically arranged in parallel. The two batteries are rechargeable through a single charging node 102 when connected to an external power source, such as to a charger 108 plugged into an outlet or other power supply. In one implementation disclosed herein, the first battery 104 and the second battery 106 are also rechargeable in the sense they may "rebalance" without a charger attached, if the system loads are light.

In different implementations, the first battery 104 and the second battery 106 may vary in relative charge capacity and positions within the electronic device 100. In one example implementation, the first battery 104 and the second battery 106 are of a same voltage type (e.g., either both single-cell packs (1S), such as 3-4.4V packs, or both dual-cell (2S), such as 6V-8.8V packs). The batteries are separate packs with independent fuel gauges. In FIG. 1, the first battery 104 has a smaller capacity than the second battery 106 and the second battery 106 and is situated closer to the system electronics 110 than the first battery 104. Additionally, the first battery 104 and the second battery 106 are located in different portions of the electronic device 100 designed to fold relative to one another due to a central hinged portion 112.

Hinge wiring 116 extends through the central hinged portion 112 to couple the first battery 104 to the second battery 106. The hinge wiring 116 acts as a constant additive source impedance contributing to total electrical loss (e.g., voltage drop and power loss under load). If the second battery 106 were alone relied on to support the system electronics 110, electrical loss due to the source impedance may be—at times—high enough to risk system brown-out under especially high load transients. In the illustrated design, however, this electrical loss is compensated for by a reduction in source impedance that is observed as a result of the close proximity between the first battery 104 and the system electronics 110. In addition to dramatically improving source impedance, the inclusion of the first battery 104 at the position shown also increases run-time capacity, a benefit that is not achieved with typical bulk storage or decoupling capacitors.

Although not shown in FIG. 1, the battery circuit 130 may include circuitry to selectively limit charge into and discharge from each of the first battery 104 and the second battery 106 according to respective battery charge characteristics. Some example circuitry serving this purpose is discussed with respect to FIGS. 2-4. In one implementation, both the first battery 104 and the second battery 106 remain coupled to the battery circuit 130 and also to one another while charging and discharging. Both of the first battery 104 and the second battery 106 can be simultaneously charged through the single charger 108 at the single charging node 102 (as shown) or through multiple chargers connected in parallel to a shared battery rail 114.

In some implementations, the battery circuit 130 permits natural charge balancing between the first battery 104 and the second battery 106. For example, the battery circuit 130 may include current limiting circuitry that facilitates a back-charge of current from the second battery 106 to the first battery 104, or vice versa, at a controlled charge rate that is safe for the battery receiving the charge. In one such implementation, the first battery 104 has a high discharge rate, such as that achieved with a construction that sacrifices milliamp hours (mAh) (e.g., battery life) for lower impedance (and therefore lower electrical loss). This reduction in mAh is acceptable because the first battery 104 can be naturally recharged by the second battery 106 when the relative voltages satisfy a predefined relationship. Further examples of charge balancing are discussed and shown with respect to FIGS. 2-4, below.

In other implementations, the battery circuit 130 does not permit natural charge balancing between the first battery 104 and the second battery 106. For example, the battery circuit 100 may permit simultaneous charging of the first battery 104 and the second battery 106 from a shared battery node (as shown) but also include a switch for selectively enabling and disabling a diode or an ideal diode that prohibits back-charging from one battery to another. In one such implementation, a charge path is switched "on" and the diode or ideal diode is switched "off" during charging. When the batteries are not being charged, the charge path switched to "off" and diode or ideal diode is switched to "on."

Figure 2:
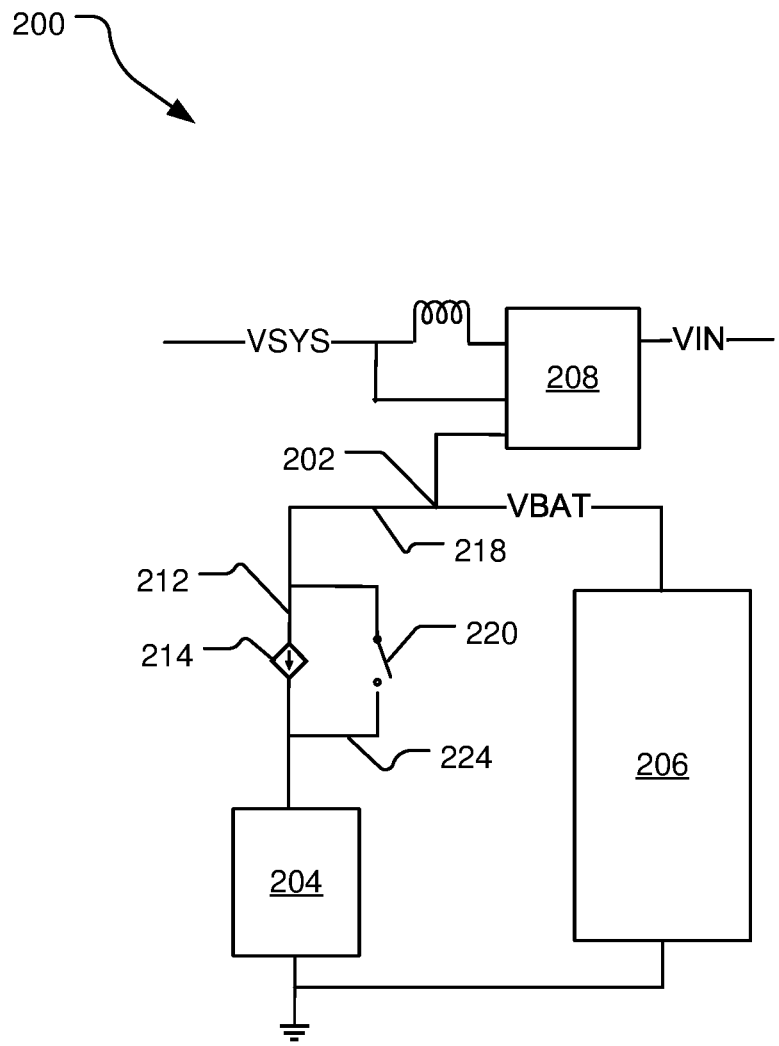
FIG. 2 illustrates an example parallel battery circuit that implements a distributed battery architecture for reducing source impedance and increasing run-time capacity.

FIG. 2 illustrates an example parallel battery circuit 200 that implements a distributed battery architecture for reducing source impedance and increasing run-time capacity. The example parallel battery circuit 200 includes two batteries connected in parallel that have disparate charge characteristics. Specifically, the parallel battery circuit 200 includes a first battery 204 and a second battery 206 that share a charging node 202. When the charging node 202 is coupled to a voltage source such as a charger 208, the first battery 204 and the second battery 206 are simultaneously charged by current flowing through the charging node 202.

In FIG. 2, the parallel battery circuit 200 is simplified for conceptual illustration and may exclude some components present in actual implementations of the disclosed technology. The parallel battery circuit 200 includes an adjustable constant current limiter 214 (e.g., an adjustable resistance) in charge path 212 of the first battery 204 downstream of a shared battery rail (VBAT), which is coupled to a voltage source through the charger 208. In one implementation, the adjustable constant current limiter 214 limits current along the charge path 212 to charge the first battery 204 at a constant rate corresponding to an active current limit set by charge control electronics (not shown). In some implementations, the charge control electronics adjustably control the active current limit based on dynamically-detected battery and system parameters, such as charge state and/or temperature. While the adjustable constant current limiter 214 and the charge control electronics may include variety of hardware and/or software configurations, some specific, non-limiting examples are discussed further with respect to FIG. 4, below.

In some implementations, the adjustable constant current limiter 214 is controlled by charge control electronics that communicate with electronics coupled to the first battery 204 and/or the second battery 206 to dynamically-assess battery parameters and use such parameters for dynamically adjusting the charge rate of the first battery 204. For example, the first battery 204 and the second battery 206 may each include internal gauges (not shown), commonly referred to a fuel gauges or gas gauges, that monitor battery parameters such as voltage, charge state, and temperature, and report changes in these battery parameters to charge control electronics that are, for example, integrated within the charger 208. By sampling battery parameters from the first battery 204 and also controlling a total current flow at the charging node 202, the charge control electronics can dynamically identify a charge rate that is optimal for the first battery 204 at a given point in time and alter setting(s) of the adjustable constant current limiter 214 and/or the charger 208 to ensure that the first battery 204 is provided a constant level of charge at the identified charge rate.

In one implementation, the charge control electronics of the parallel battery circuit 200 alter the constant charge rate set by the adjustable constant current limiter 214 responsive to a detected change in a battery parameter. When, for example, a change is detected in a charge state and/or temperature for the first battery 204, the charge control electronics may identify and select a new charge rate that corresponds to the changed battery parameters, such as by accessing stored battery time-charge profile information. The charge control electronics may then alter a reference setting of the adjustable constant current limiter 214 to begin charging the first battery 204 at the updated charge rate. In one implementation, the charge control electronics also adjust a total output setting of the charger 208 when altering the reference setting of the adjustable constant current limiter 214. This ensures that the charge output of the charger 208 remains the sum of a predetermined charge rate for the second battery 206 and the updated charge rate for the first battery 204.

In one implementation, the adjustable constant current limiter 214 toggles between "on" and "off" states based on voltage conditions detected within the parallel battery circuit 200. In the "off" state, the adjustable constant current limiter 214 may provide low or near-zero impedance. In the "on" state, the adjustable constant current limiter 214 limits a current flow to the first battery 204 along the charge path 212 based on the currently-selected charge rate. For example, the adjustable constant current limiter 214 remains in the off state when a voltage detected along the shared battery rail (VBAT) is sufficiently low such that a corresponding influx of charge at the first battery 204 is below the currently-selected charge rate, but toggles to the on state once the voltage along the shared battery rail rises to a threshold such as to generate enough current that it is beneficial to enable active current limiting to protect the first battery 204.

In addition to controlling charge to the first battery 204, the parallel battery circuit 200 also includes mechanisms for controlling discharge of the first battery 204. In FIG. 2, the parallel battery circuit 200 includes a discharge path 224 controlled by a bypass discharge switch 220. By design, the discharge path 224 provides lower total impedance than the charge path 212, even when the adjustable constant current limiter 214 is not actively contributing impedance to the charge path. Consequently, the first battery 204 discharges along the discharge path 224 whenever the bypass discharge switch 220 is closed, bypassing the adjustable constant current limiter 214 either to support a system load or to back-charge into the second battery 206. Impedance of the discharge path 224 may be selected based on charge characteristics of the first battery 204 and system requirements, such as to support system transients while still discharging the first battery 204 at a safe discharge rate. In some implementations, the discharge path resistance is tunable to allow selective variation of the discharge rate relative to the other batteries.

Although shown to be a simple switch, the bypass discharge switch 220 may take on a variety of forms that perform the role of switching current flow on or off along the discharge path 224 based on control parameters managed by discharge control electronics (not shown). The discharge control electronics may, for example, include hardware, software, or a combination of hardware and software components to selectively discharge current responsive to satisfaction of certain system conditions. In one implementation, the discharge control electronics selectively close the bypass discharge switch 220 at times when a measured voltage along the shared battery line 218 is detected below a predetermined threshold (e.g., when the second battery 206 has a low state of charge relative to the first battery 204, or when a system load transient pulls the charging node 202 temporarily lower than the voltage of the first battery 204).

In at least one implementation, conditions that trigger opening/closing of the bypass discharge switch 220 are adjustable to allow selective variation of the discharge rate. Adjustability of the threshold for opening and closing the bypass discharge switch 220 may also be useful to permit swapping of the first battery 204 with another battery having disparate charge characteristics during the lifetime of the electronic device 200. Notably, some implementations of the disclosed technology may not include the discharge path 224. In these implementations, the first battery 204 may be both charged and discharged along the charge path 212.

As described above, the illustrated parallel battery circuit 200 facilitates independent charging of the two batteries at different charge rates. In one implementation, the charger 208 includes a microprocessor that communicates with the control electronics of the first battery 204 and the second battery 206 to dynamically determine battery parameters. The charger 208 selectively meters a total charge supplied at the charging node 202 to ensure that the second battery 206 is charged at constant selected charge rate corresponding to its current battery parameters (e.g., the charge rate of the second battery 206 is the difference between the total charge supplied and the active current limit currently-implemented by the adjustable constant current limiter 214).

In addition to facilitating simultaneous charging of disparate batteries at different charge rates, the illustrated parallel battery circuit 200 also facilitates charge balancing between the first battery 204 and the second battery 206 when charging from the charger 208 is disabled (e.g., no power supply unit is attached) and when a system power draw is low. Under such conditions, the second battery 206 may discharge current into the first battery 204 along the charge path 212, through the adjustable constant current limiter 214. Likewise, the discharge control electronics may selectively close the bypass discharge switch 220 at times to power a system load with the first battery 204 and/or to allow the first battery 204 to back-charge into the second battery 206.

In the design represented by FIG. 2, it is anticipated that current discharging along the discharge path 214 is, by consequence of the select battery capacities and discharge path resistance, at a rate that is safe for the second battery 206. In systems where there is a risk of discharge from the first battery 204 at a rate that is unsafe for back-charge into the second battery 206, charge limiting circuitry may additionally be included at the input to the second battery 206, as shown and described with respect to FIG. 3, below.

Figure 3:
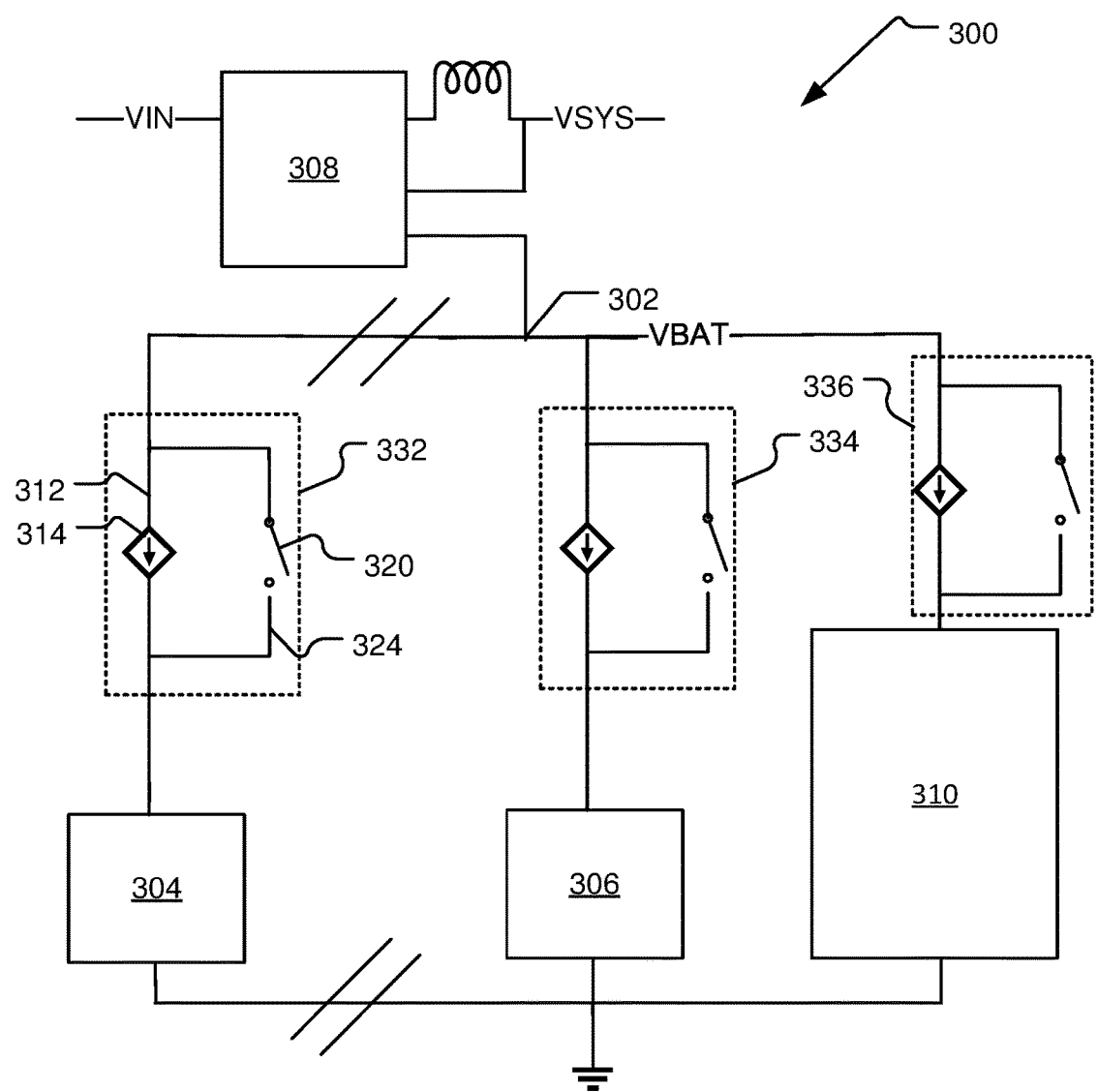
FIG. 3 illustrates another example parallel battery circuit implementing a distributed battery architecture for reducing source impedance and increasing run-time capacity.

FIG. 3 illustrates another example battery circuit 300 implementing a distributed battery architecture for reducing source impedance and increasing run-time capacity. In contrast to the battery circuits discussed with respect to FIGS. 1 and 2, the battery circuit 300 supports any "n" number of batteries coupled in parallel to a shared battery rail (VBAT). At least two of the "n" batteries have disparate charge characteristics. In one implementation, the various batteries in the battery circuit 310 are of a same voltage level and implement lithium polymer technology. For example, both batteries may have 1S packs, such as 3-4.4 V packs, or both batteries may have 2S packs, such as 6V-8.8V packs. In one implementation, the batteries have different capacities. In another implementation, the batteries have equal or near equal capacities, but due to load balancing and physical placement, discharge at different rates.

The shared battery rail (VBAT) may be connected to one or more chargers to simultaneously charge all "n" batteries connected in parallel to the shared battery rail. In FIG. 3, a single charger 308 is shown coupled to shared charging node 302, which supplies charge to each of three batteries (e.g., a first battery 304, a second battery 306, and a third battery 310).

Notably, some implementations may couple more than one charger to the shared battery rail (VBAT), such as in order to increase a total charge rate or influence a thermal distribution in the battery circuit 300. Even in these implementations, however, one or more of the multiple chargers may be disconnected from the shared battery rail (VBAT) to allow a single charger to simultaneously provide charge to each of the "n" batteries in the system.

Each of the "n" batteries in the battery circuit 300 is coupled to respective battery-independent charge control circuitry 332, 334, and 336. When each battery is charging or discharging, current flows through the respective battery-independent charge control circuitry 332, 334, or 336 to charge or discharge the corresponding battery at a predetermined, controlled rate that is independent of the charge and discharge rates of any of the other parallel batteries in the battery circuit 300.

In the following description, specific emphasis is given to features of the battery-independent charge control circuitry 332, shown coupled to the first battery 304 of the "n" batteries. The battery-independent charge control circuitry 334 and 336 may include the same or similar features and is therefore not described in detail below.

The battery-independent charge control circuitry 332 includes an adjustable constant current limiter 314 (e.g., an adjustable resistance) in a charge path 312 to the first battery 304. The adjustable constant current limiter 314 limits current along the charge path 312 to charge the first battery 304 to a constant rate according to an active current limit set by charge control electronics (not shown). When the first battery 304 is utilized to support a system load, current may be controllably discharged through the adjustable constant current limiter 314 or along a discharge path 324 if a bypass discharge switch 320 is selectively closed.

When the bypass discharge switch 320 is selectively closed, discharged current is shunted along the discharge path 324, bypassing the adjustable constant current limiter 314. In one implementation, the bypass discharge switch 320 is selectively closed responsive to a decrease in voltage of the shared battery rail (VBAT) to below a predetermined threshold. The closing of the bypass discharge switch 320 allows current to discharge from the first battery 304 to support a system load and/or re-charge one or more of the other batteries in the battery circuit 300. Notably, some implementations may include the adjustable constant current limiter 314 and not include the bypass discharge switch 320.

Voltage along the shared battery rail (VBAT) may be lower than a voltage of the first battery 304 in situations where the battery circuit 300 is supporting a high system load or when one or more of the other batteries is at a lower voltage or state of charge than the first battery 304 (such as because it has discharged at a different rate). When this low voltage is detected along the shared battery rail and the bypass discharge switch 320 is closed, the first battery 304 is selectively discharged at a higher rate (e.g., unimpeded by resistance in the charge path 312) to support the load transient and/or to recharge and rebalance with other batteries in the system currently at a lower state of charge.

The inclusion of the battery-independent charge control circuitry 332, 334, or 336 for each of the 'n' batteries may be particularly beneficial in systems where each battery could potentially be damaged by a back-charge from at least one other of the 'n' batteries in the system. Batteries of even slightly different capacities or physical placement may become unbalanced during discharge and may flow charge to equalize their relative charge states when an external power supply is disconnected. The likelihood of this type of back-charge is particularly high when, for example, a fresh battery pack is installed to replace one of the batteries, and the replacement battery has a charge state that is significantly different than a charge state of one or more of the other batteries in the parallel battery circuit 300.

With the battery circuit 300, if the batteries in the system are at a lower state of charge than a newly replaced battery, the new battery may naturally discharge to the shared battery rail (VBAT) and into any of the other 'n' batteries with a lower state of charge. Due to the inclusion of the battery-independent charge control circuitry 332, 334, and 336, the flow rate of this back-charge is controlled at the charge input to each one of the receiving batteries (e.g., the second battery 306 and the third battery 310), ensuring that each battery is safely charged at a rate based on its individual charge characteristics.

Additionally, the inclusion of an adjustable constant current limiter (e.g., the adjustable constant current limiter 314) on the input to each battery may also ensure safe levels of back-charge and charge rebalancing when the temperature of the charging battery is outside of a recommended "safe" temperature charging range. For example, the charge control electronics may control the adjustable constant current limiter 314 to prevent or reduce charging at times when a temperature of the first battery 304 is outside of the safe temperature charging range.

Figure 4:
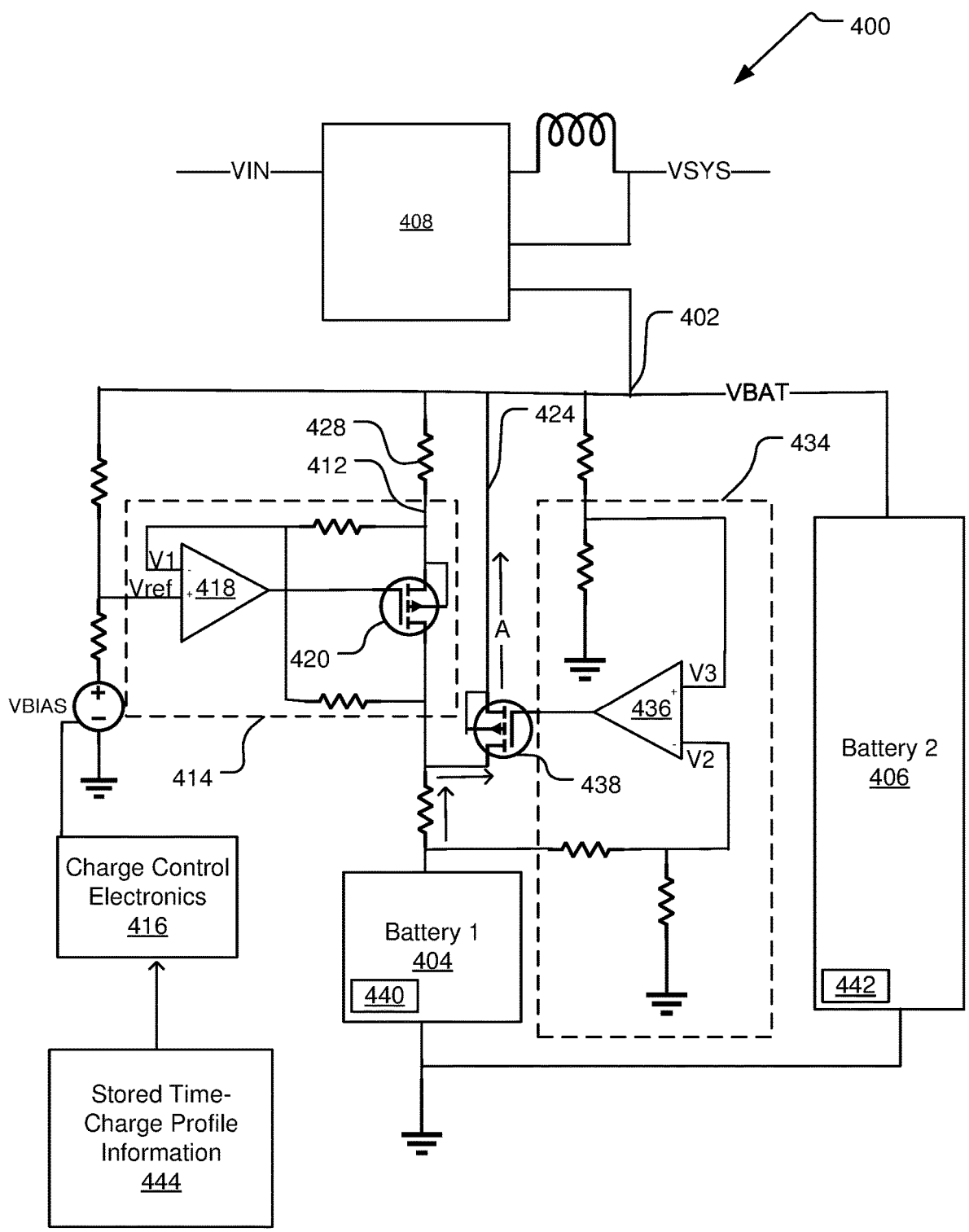
FIG. 4 illustrates an example circuit for implementing a distributed battery architecture for reducing source impedance and increasing run-time capacity.

FIG. 4 illustrates an example circuit 400 for implementing a distributed battery architecture for reducing source impedance and increasing run-time capacity. In one implementation, the example circuit 400 is a more detailed representation of the battery circuit 200 shown in FIG. 2.

The example circuit 400 includes a charging node 402 that couples to a voltage source through a charger 408 to simultaneously charge a first battery 404 and a second battery 406. In one implementation, the first battery 404 has a lower capacity than the second battery 406. Other battery charge characteristics are such that back-charge from the first battery 404 does not pose a risk of damage to the second battery 406. Specifically, system specifications are such that back-charge from the first battery 404 into the second battery 406 does not occur at a charge rate that exceeds a recommended charge rate for the second battery 406 based on a current state in its corresponding time-charge profile.

To ensure that the first battery 404 (e.g., the smaller capacity battery) is charged at a safe rate, the example circuit 400 includes an adjustable constant current limiter 414 in a charge path 412. Although the adjustable constant current limiter 414 may take on other forms in other implementations, the adjustable constant current limiter 414 is shown to include an op-amp 418 controlling a transistor (e.g., PFET 420) operating in a linear mode by adjusting the voltage applied to drive the gate of the transistor. This applied voltage at the gate controllably varies impedance in the charge path 412 to charge the first battery 404 at a constant charge rate that is selected (and dynamically alterable) by charge control electronics 416, which may include hardware, software, or a combination of hardware and software.

In one implementation, the charge control electronics 416 include one or more microprocessors to determine current battery parameters and to select and/or periodically adjust a charge rate based on the battery parameters and/or other information, such as stored time-charge profile information 444. For example, the charge control electronics 416 may alter a reference voltage (Vref) of the op-amp 418 to change the constant charge rate of the first battery 404. In different implementations, the reference voltage (Vref) may be set in different ways, such as with a resistor divider formed with passive resistors, switchable resistors, digipot, a digital-to-analog converter (DAC) or other means of providing a voltage reference.

In operation, the op-amp 418 compares a direct measurement of the charge current (e.g., a sense voltage V1) to the reference voltage Vref. The sense voltage (V1) is derived from the voltage drop across a sense resistor 428 carrying the charge current from the charging node 402 to the first battery 404. Because the value of the sense resistor 428 is known, and the reference voltage (Vref) and sense resistor 428 are both referencing a shared VBAT node, any change in the VBAT voltage is rejected by the op-amp 418. When the sense voltage (V1) is less than the reference voltage (Vref), the op-amp 418 increases the gate drive voltage, thereby turning off the PFET 420 incrementally, increasing the resistance in the charge path 412 and thus limiting the charge current to the set-point per the reference voltage (Vref) setting. When the reference voltage (Vref) is less than the sense voltage (V1), the adjustable constant current limiter 414 incrementally reduces its gate drive voltage, thus turning ON the PFET 420 more and more. Therefore, if the current sensed through the sense resistor 428 is below the active current limit of the adjustable constant current limiter 414, the op-amp 418 output is driven low. Here, the adjustable constant current limiter 414 is effectively "off" and the resistance in the charge path 412 consists of the value of the sense resistor 428 and the on-state resistance of the PFET 420.

In FIG. 4, fuel gauge IC 440 and 442 is included within battery packs of the first battery 404 and the second battery 406, respectively. The fuel gauge IC 440 and 442 monitors battery parameters, such as state of charge, current, voltage and temperature, and reports this information to the charge control electronics 416.

The charge control electronics 416, in turn, analyze the received battery parameters to determine a recommended charge rate for each battery. For example, the charge control electronics 416 may include software and/or firmware executed by a system-on-chip (SoC) or computer processing unit (CPU) of a corresponding device. In one implementation, the charge control electronics 316 are included in the charger 408. The charge control electronics 416 process the battery parameters received from the fuel gauge IC 440 and 442 and identify corresponding values within stored time-charge profile information 444 (e.g., pre-programmed table(s)) to determine the target charge rates for each battery.

Once the charge control electronics 416 has determined the target charge rates for each battery, the charge control electronics 416 use this information to adjust both output of the charger 408 and to alter the reference voltage (Vref) input to the adjustable constant current limiter 414. In this manner, the charge control electronics 416 set the constant current limit for each battery as specified by a pre-programmed table(s).

The charge path 412 includes a sense resistor 428, which causes more current to be drawn from the second battery 406 (the larger battery) than the first battery 404 when supporting a load than a current draw resulting from a direct connection without the sense resistor 428. This may improve load balancing depending on the capacity vs. impedance ratio of each battery path relative to the load. Additionally, when there are light or no loads on the circuit 400, and if the first battery 404 has discharged more than the second battery 406, the second battery 406 may naturally back-charge the first battery 404 through the adjustable constant current limiter 414 and the sense resistor 428 until the active current limit of the adjustable constant current limiter 414 is reached, rebalancing the packs to prepare for future load transients and extend run-time.

In one implementation, the resistance of the sense resistor 428 is selected to be large enough to provide a reasonable signal level during low charging levels to the first battery, but small enough that additional impedance from the PFET 420 is still utilized to limit current flow to the active current limit when back-charge from battery 406 or charging from the charger 408 at the shared charging node 402. This ensures that the adjustable constant current limiter 414 can achieve the desired setting by linearly increasing resistance of the charge path 412 while protecting the first battery 404 even when the PFET 420 is off.

In one exemplary implementation, the charge control electronics 416 are implemented within the charger 408 and utilize an I2C protocol to request current battery parameters from the fuel gauge IC 442 within the second battery. In response to this request, the fuel gauge IC 442 of the second battery 406 transmits information to the charger 408 indicating a level of charge (e.g., 40% charged) and other information such as current temperature and cycle count. Using this information (such as by consulting one or more look-up tables), the charge control electronics 416 determine that the appropriate charge rate for the second battery is C2. The charge control electronics 416 similarly obtain battery parameters from the fuel gauge IC 440 within the first battery 404 to determine that the active current limit provided by the adjustable constant current limiter 414 is C1. Responsive to such determination, the charge control electronics 416 adjust the active current limit setting to C1, and then alter a total charge current from charger 408 to equal the sum of C1, C2, thereby ensuring that the first battery 404 charges at C1 while the second battery 406 charges at C2. In one implementation, the fuel gauge IC 440, 442 additional provides the charge control electronics 416 with the actual values of current flowing into each battery, and the charge control electronics 416 adjust C1, C2, as necessary, to account for any errors.

In addition to the features described above, the circuit 400 further includes a discharge path 424 and bypass discharge controls 434 that selectively enable and disable current flow along the discharge path 424 based on system parameters. Notably, some implementations do not include the discharge path 424 or the bypass discharge controls 434.

In FIG. 4, the discharge path 424 provides a lower total impedance than the charge path 412, even when the adjustable constant current limiter 414 is not actively contributing impedance to the charge path, by decoupling the sense resistor 428 from the discharge path 424. FIG. 4 includes arrows along the discharge path 424 (e.g., an arrow A) to indicate a direction of current flow along the discharge path 424. In FIG. 4, the bypass discharge controls 434 are shown to include hardware components (e.g., various resistors and op-amp 436, which may be a comparator in some implementations). In other implementations, the bypass discharge controls 434 may additionally include software components, such as firmware that tunes resistance values or controls the enabling and disabling based on detected battery and/or system information.

In FIG. 4, the op-amp 436 acts as a differential amplifier (much like a comparator) to continuously monitor and compare a voltage of the first battery 404 (along an input V2) and a voltage of the charging node 402 (along an input V3). The op-amp 436 supplies an output that adjusts the gate drive of a bypass FET 438. In at least one implementation, the example circuit 400 includes a comparator in place of the op-amp 436. Threshold level of the op-amp 436 are set such that the bypass FET 438 provides a high level of impedance, blocking the flow of current along the discharge path 424, when the input V3 is greater than the input V2. Consequently, the discharge path 424 is not enabled when the second battery 406 has a high level of charge relative to the first battery 404 or when the charger 408 is active. When the voltage at the charging node 402 (V3) drops below a predetermined threshold (e.g., by some amount below V2), the op-amp 436 enables the bypass FET 438 to reduce its applied impedance to zero or near-zero. This reduction in impedance along the discharge path 424 shunts current around the adjustable constant current limiter 414, thus ensuring an essentially direct connection of the first battery 404 to the shared VBAT node to support the load transient pulling the VBAT node voltage below the voltage of the first battery 404.

When the bypass FET 438 is enabled to flow current along the discharge path 424, as described above, the impedance in the discharge path 424 is lower than impedance in the charge path 412. This, in effect, allows the first battery 404 to be selectively discharged along the discharge path 424 when a system load demands support from the first battery 404, which may, for example, occur when the VBAT rail has experienced a voltage drop and the second battery 406 can no longer support the load independently, even if battery 406 is at a higher state of charge.

By controlling the adjustable active current limiter 414 to set a low current limit during back-charging, energy losses during back-charge can be reduced at the expense of slower charge balancing between the two batteries. By allowing a higher back-charge current rate (e.g., within the allowable range based on charge profile due to state of charge and temperature), a faster back charge and rebalancing can be achieved at the expense of some lost energy. This tradeoff can be made based on the use case, product or dynamically based on the scenario or parameters and system needs.

The above-described circuitry for load balancing is particularly advantageous when implemented in electronic devices that rely on continuous simultaneous operation of multiple parallel batteries. For example, a smaller battery may be included near a load source as a way of reducing source impedance to support high load transients. In these devices, depletion of one battery results in a system brownout, rendering the system unable to operate until re-charged. The above-described back-charging between batteries of different capacities and/or charge states can effectively extend run-time of such a device by allowing a smaller battery (which may otherwise deplete more quickly than a larger battery) to re-charge from and balance with the larger battery without utilizing additional standard chargers or ever isolating the battery packs. Notably, some implementations may include more than two batteries connected in parallel and/or charge control circuitry (e.g., such as the adjustable constant current limiter 414 and the bypass discharge controls 434) in the charge/discharge paths to each battery, as shown in FIG. 3.

Figure 5:
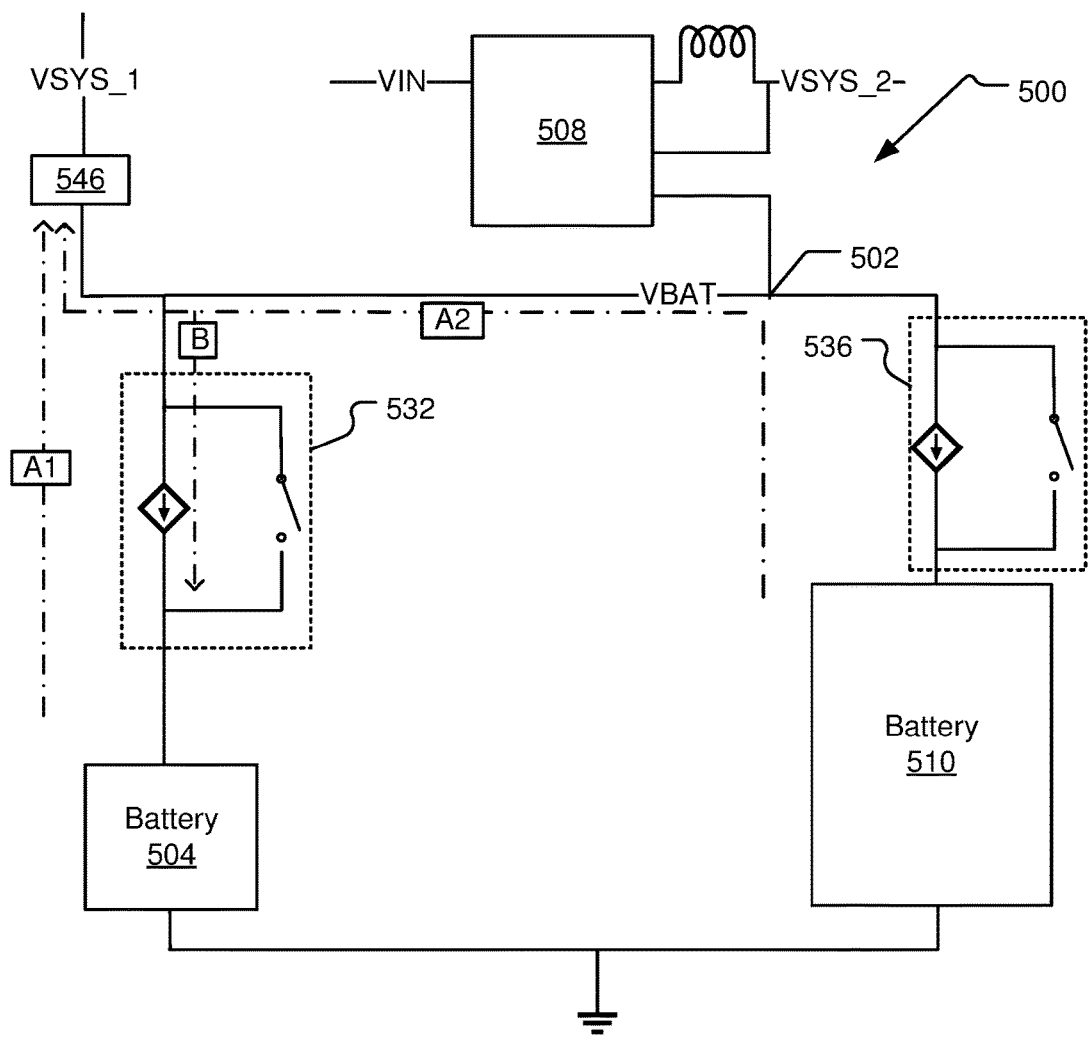
FIG. 5 illustrates example load supply and charge balancing between parallel batteries of another example circuit.
Figure 5:
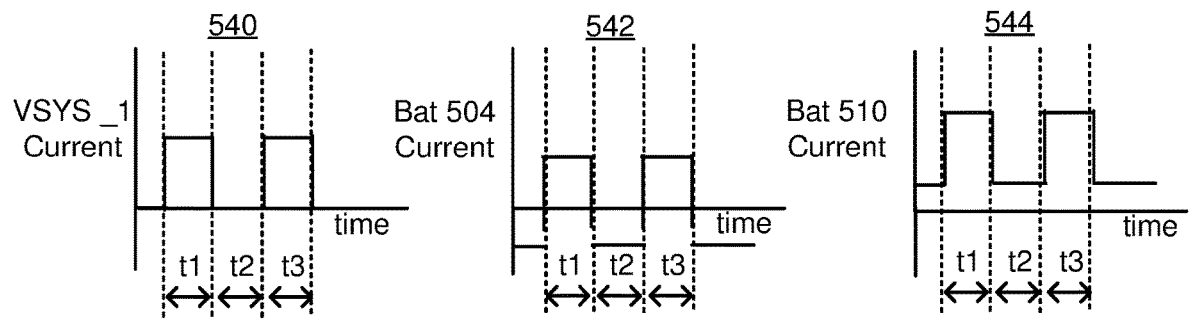

FIG. 5 illustrates example charge balancing between parallel batteries within another example circuit 500. The circuit 500 includes a first battery 504 and a second battery 510 coupled in parallel to a shared battery rail (VBAT). The shared battery rail is shown connected to a charger 508, which simultaneously charges the first battery 504 and the second battery 510 when connected to a power source without electrically isolating the two batteries from one another.

The first battery 504 is connected to battery-independent charge control circuitry 532 and the second battery 510 is connected to battery-independent charge control circuitry 536. When each battery is charging or discharging, current flows through the respective battery-independent charge control circuitry 532 or 536 to charge or discharge the corresponding battery at a predetermined, controlled rate that is independent of the charge and discharge rates of the other battery. In the illustrated example, the first battery 504 has a smaller capacity than the second battery 510.

Specific aspects of the battery-independent charge control circuitry 532 and 536 may be the same or similar to that described with respect to the battery-independent charge control circuitry 332, 334, and 336 described with respect to FIG. 3, above.

In addition to the circuit 500, FIG. 5 additionally illustrates three current-time plots 540, 542, and 544 showing current draw changes over time at each of three respective locations within the battery circuit 500. Specifically, the current-time plot 540 illustrates current flow along a first system rail (VSYS_1) to support a first load; the current-time plot 542 illustrates current draw of the first battery 504; and the current-time plot 544 illustrates current draw of the second battery 510. The first system rail (VSYS_1) is shown coupled to a shared battery node (VBAT) by a connector 546, which may be a resistor, load switch, or other mechanism for connecting to the shared battery node. In FIG. 5, the shared battery node (VBAT) is also shown supporting another system rail (VSYS_2), which provides a discharge path to support a second load. For example, VSYS_1 and VSYS_2 may represent rails supporting different electronic subsystems of an electronic device. In different implementations, the shared battery node (VBAT) may couple to any number of system rails to support any number of separate loads. In the example shown by the current-time plots 540, 542, and 544 it is, for simplicity, assumed that VSYS_2 is not drawing any load.

During a first time period "t1" (as indicated on each of the current time plots 540, 542, and 544, the first system rail (VSYS_1) draws a non-zero current from the battery circuit 500. This current is provided by both the first battery 504 and the second battery 510 along the paths labeled "A1" and "A2", respectively, based on their relative voltages and source impedance.

During a subsequent time period "t2," the first system rail (VSYS_1) does not draw any current. In the illustrated example, the first battery 504 has a lower state of charge and voltage than the second battery 510 at this time. Consequently, the first battery 504 begins charging (as indicated by negative current spanning the time period t2 on the plot 542), drawing current from the second battery 510 along a first portion of the path A2 and into the path labeled "B."

During a subsequent time period "t3," the current draw by the first system rail (VSYS_1) increases again. The first battery 504 and the second battery 510 discharge over paths A1 and A2, respectively, to supply the system load, based on their relative voltages and source impedance.

If the first battery 504 were removed from the system, all load pulses would then be supported by the second battery 510. However, since the second battery 510 is at a considerable distance away from the first battery 504, route impedance may lead to a large voltage drop along the path A2, which could brown out the VSYS_1 loads and/or the VSYS_2 loads as well. When system loads are jointly supported by both the first battery 504 and the second battery, as shown, voltage deviation is decreased along the supported system rails (VSYS_1) and (VSYS_2) and the risk of system brown-outs is thereby decreased.

Figure 6:
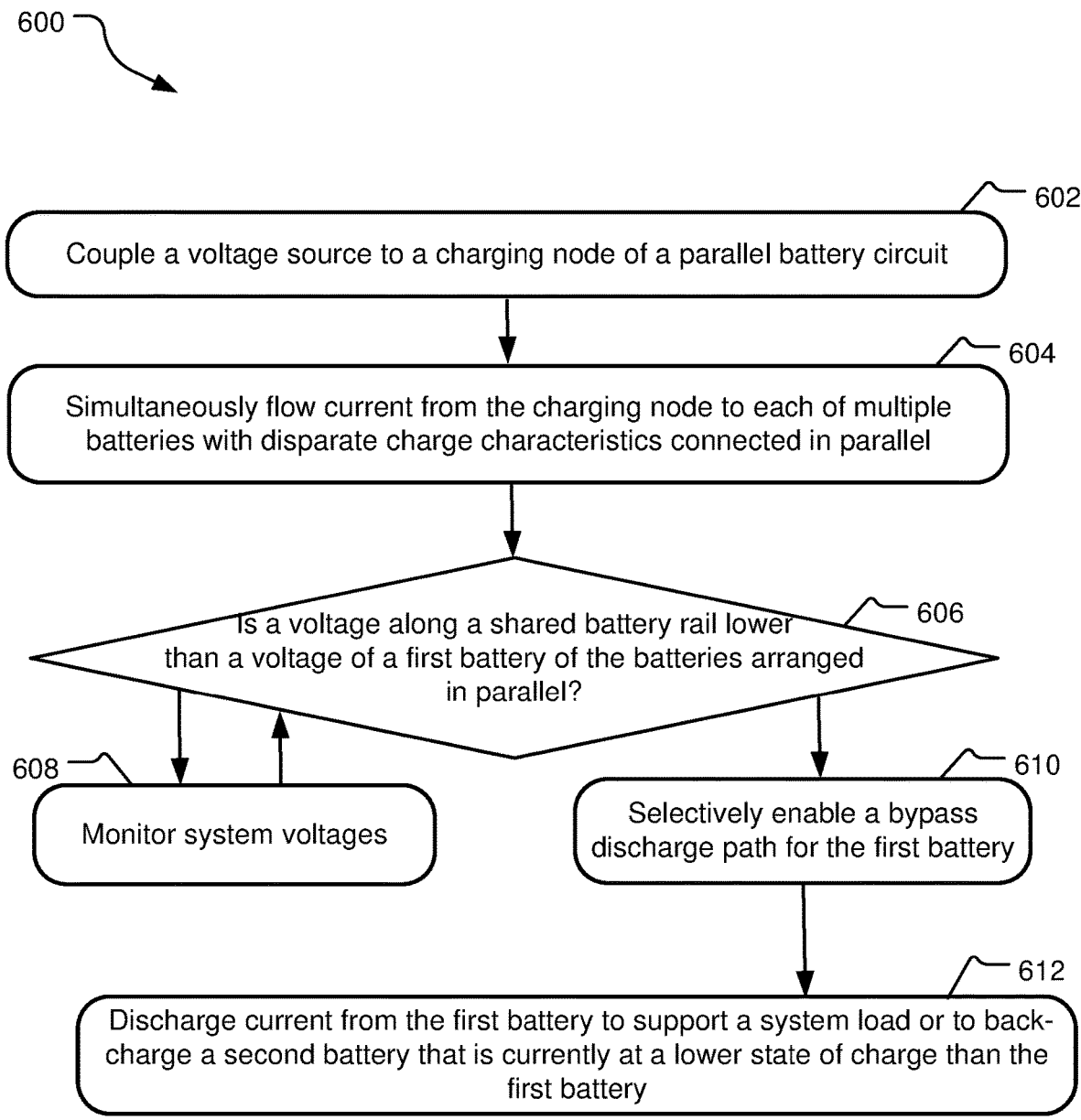
FIG. 6 illustrates example operations of a distributed battery architecture that reduces source impedance and increases run-time capacity.

FIG. 6 illustrates example operations 600 of a distributed battery architecture that reduces source impedance and increases run-time capacity. A voltage coupling operation 602 couples a voltage source to a charging node of a battery circuit to support a charging operation 604 that simultaneously charges multiple batteries connected in parallel and having disparate charge characteristics. In one implementation, the multiple batteries in the battery circuit are charged simultaneously without disconnecting any batteries from the circuit or from one another.

A determination operation 606 determines whether a voltage along a shared battery rail is lower than a voltage of a first battery of the multiple batteries arranged in parallel. For example, the shared battery rail is usable to couple each of the batteries to the voltage source through the charging node. In general, the voltage along the shared battery rail may be lower than a voltage of the first battery at times when the battery circuit is supporting a high system load or when one or more of the other batteries is at a lower voltage or state of charge than the first battery.

If the voltage on the shared battery rail is higher than the voltage of the first battery, charge limiting circuitry allows charging of the first battery at a rate at or below a charge level that is dynamically selectable and alterable based on current battery and system parameters. Meanwhile, a monitoring operation 608 monitors system voltages until the voltage on the shared battery rail is lower than the voltage of the first battery, at which time a path selection operation 610 selectively enables a bypass discharge path to allow more current to flow from the small battery to support the load. In one implementation, the path selection operation 610 enables the bypass discharge path by lowering impedance in a discharge path to shunt current around the charge limiting circuitry that limits current flow into the first battery. When the bypass discharge path is selectively enabled in this way, the first battery boosts the voltage on the shared battery rail to support a load transient and/or recharge and rebalance with other batteries in the system currently at a lower state of charge.

A discharge operation 612 discharges current from the first battery to either support a system load or to selectively back-charge one or more other batteries that is currently at a lower state of charge than the first battery.

Figure 7:
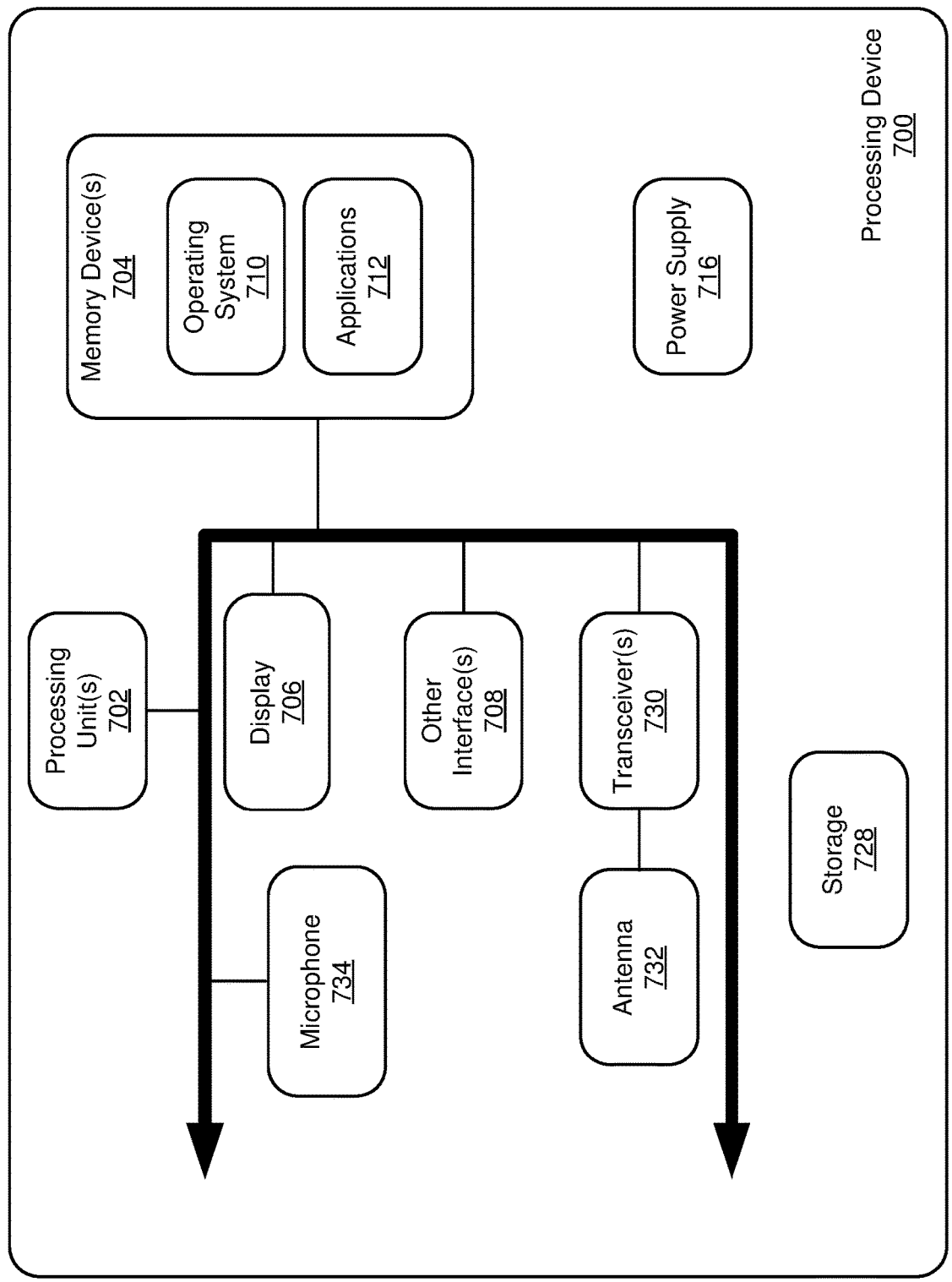
FIG. 7 illustrates an example block diagram of a processing device that may facilitate charge rate selection and/or alteration based on a dynamically-detected battery parameter.

FIG. 7 illustrates an example block diagram of a processing device 700 that may facilitate charge rate selection and/or alteration based on a dynamically-detected battery parameter. The processing device 700 includes one or more processing unit(s) 702, one or more memory devices 704, a display 706, and other interfaces 708 (e.g., buttons). The memory devices 704 generally includes both volatile memory (e.g., RAM) and non-volatile memory (e.g., flash memory). An operating system 710, such as the Microsoft Windows® operating system, the Microsoft Windows® Phone operating system or a specific operating system designed for a gaming device, resides in the memory devices 704 and is executed by the processing unit(s) 702, although other operating systems may be employed.

One or more applications 712, such as applications included within the charge control electronics or discharge control electronics, are loaded in the memory device(s) 704 and executed on the operating system 710 by the processing unit(s) 702. The processing device 700 includes a power supply 716, which is powered by one or more batteries or other power sources and which provides power to other components of the processing device 700. The power supply 716 may also be connected to an external power source that overrides or recharges the built-in batteries or other power sources.

The processing device 700 includes one or more communication transceivers 730 and an antenna 732 to provide network connectivity (e.g., a mobile phone network, Wi-Fi®, BlueTooth®). The processing device 700 may also include various other components, such as a positioning system (e.g., a global positioning satellite transceiver), one or more accelerometers, one or more cameras, an audio interface (e.g., a microphone 734, an audio amplifier and speaker and/or audio jack), and storage devices 728. Other configurations may also be employed. In an example implementation, a mobile operating system, various applications and other modules and services may be embodied by instructions stored in memory device(s) 704 and/or storage devices 728 and processed by the processing unit(s) 702. The memory device(s) 704 may include memory of host device or of an accessory that couples to a host.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example system disclosed herein includes multiple batteries having disparate charge characteristics and connected in parallel to a voltage source through a shared charging node that simultaneously charges each of the multiple batteries.

An example system according to any preceding system that includes charge control circuitry that balances charge between each of the multiple batteries when the voltage source is disconnected from the shared charging node.

Another example system of any preceding system further includes load source electronics positioned closer to a first battery of the multiple batteries than a second battery of the multiple batteries, the first battery having a lower capacity than the second battery.

In still another example system of any preceding system, a path impedance is lower between load source electronics and the first battery than between the load source electronics and the second battery.

In yet another example system of any preceding system, the charge control circuitry selectively discharges current from the first battery along a discharge path bypassing an adjustable constant current limiter responsive to a voltage drop detected on a shared battery rail.

In still another example system of any preceding system, the charge control circuitry includes an adjustable constant current limiter.

In another yet example system of any preceding system, the adjustable constant current limiter limits a maximum flow of current between the shared charging node and the first battery according to a dynamically determined battery parameter.

An example device disclosed herein includes a first battery and a second battery having disparate charge characteristics that are connected in parallel. The first battery and the second battery are coupled to a same voltage source through a shared a charging node that simultaneously charges both the first battery and the second battery.

Another example device according to any preceding device includes load source electronics positioned closer to the first battery than the second battery.

In still another example device of any preceding device, a path impedance is lower between load source electronics and the first battery than between the load source electronics and the second battery.

In still another example device of any preceding device, the first battery has a lower capacity than the second battery.

Another example device of any preceding device further includes charge control circuitry that balances charge between the first battery and the second battery when the voltage source is disconnected from the charging node.

In another example device of any preceding device, the charge control circuitry includes an adjustable constant current limiter.

In still another example device of any preceding device, the charge control circuitry selectively discharges current from the first battery along a discharge path bypassing the adjustable constant current limiter responsive to a voltage drop detected on a shared battery rail.

In still another example device any preceding device, the adjustable constant current limiter limits a maximum flow of current between the shared charging node and the first battery according to a dynamically-determined battery parameter.

In still another example device any preceding device, the first battery is included with load source electronics in a first portion of the device and the second battery is included in a second portion of the device that folds relative to the first portion.

An example method disclosed herein provides for flowing current from a charging node to multiple batteries connected in parallel within a battery circuit to simultaneously charge each of the multiple batteries, the multiple batteries having disparate charge characteristics.

Another example method according to any preceding method further provides for balancing charge between each of the multiple batteries when the voltage source is disconnected from the shared charging node.

In still another example method of any preceding method, balancing the charge further includes selectively enabling current discharge from a first one of the multiple batteries responsive a detected voltage drop on a shared battery rail.

In another example method of any preceding method, the battery circuit further includes load source electronics positioned closer to a first battery of the multiple batteries than a second battery of the multiple batteries. The first battery has a lower capacity than the second battery.

An example system disclosed herein includes a means for flowing current from a charging node to multiple batteries connected in parallel within a battery circuit to simultaneously charge each of the multiple batteries, the multiple batteries having disparate charge characteristics.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:
1. A system comprising:
   multiple batteries having disparate charge characteristics associated with different charge or discharge rates, the multiple batteries being connected in parallel to a voltage source through a shared charging node that simultaneously charges each of the multiple batteries; and charge control circuitry that:
controls an adjustable resistance of an adjustable constant current limiter in a charge path of a first battery of the multiple batteries to balance charge between the first battery and a second battery of the multiple batteries when a voltage of a shared battery rail satisfies a first condition; and
selectively enables a discharge path to support a system load with the first battery when a voltage of the shared battery rail satisfies a second condition, the discharge path bypassing the adjustable constant current limiter and having a total impedance lower than the charge path.

2. The system of claim 1, further comprising:
load source electronics positioned closer to the first battery of the multiple batteries than the second battery of the multiple batteries, the first battery having a lower capacity than the second battery.

3. The system of claim 2, wherein a path impedance is lower between load source electronics and the first battery than between the load source electronics and the second battery.

4. The system of claim 1, wherein the charge control circuitry controls a switch to selectively discharge current from the first battery along the discharge path bypassing the adjustable constant current limiter responsive to a voltage drop detected on the shared battery rail.

5. The system of claim 1, wherein the adjustable constant current limiter limits a maximum flow of current between the shared charging node and the first battery according to a dynamically determined battery parameter.

6. The system of claim 1, wherein the adjustable constant current limiter includes a transistor operating in a linear mode.

7. The system of claim 6, wherein the adjustable constant current limiter limits a maximum flow of current between the shared charging node and the first battery by adjusting a gate voltage of the transistor.

8. The system of claim 5, wherein the dynamically determined battery parameter includes at least one of: temperature and charge state.

9. A device comprising:
a first battery and a second battery having disparate charge characteristics associated with different charge or discharge rates, the first battery and the second battery being connected in parallel, the first battery and the second battery further coupled to a voltage source through a shared charging node that simultaneously charges both the first battery and the second battery; and charge control circuitry adapted to:
control an adjustable resistance of an adjustable constant current limiter in a charge path of the first battery to balance charge between the first battery and the second battery when a voltage of a shared battery rail satisfies a first condition; and
selectively enable a discharge path to support a system load with the first battery when a voltage of the shared battery rail satisfies a second condition, the discharge path bypassing the adjustable constant current limiter and having a total impedance lower than the charge path.

10. The device of claim 9, further comprising:
load source electronics positioned closer to the first battery than the second battery.

11. The device of claim 9, wherein a path impedance is lower between load source electronics and the first battery than between the load source electronics and the second battery.

12. The device of claim 9, wherein the first battery has a lower capacity than the second battery.

13. The device of claim 9, wherein the charge control circuitry controls a switch to selectively discharge current from the first battery along the discharge path bypassing the adjustable constant current limiter responsive to a voltage drop detected on shared battery rail.

14. The device of claim 9, wherein the adjustable constant current limiter limits a maximum flow of current between the shared charging node and the first battery according to a dynamically-determined battery parameter.

15. The device of claim 9, wherein the first battery is included with load source electronics in a first portion of the device and the second battery is included in a second portion of the device that folds relative to the first portion.

16. A method comprising:
flowing current from a charging node to multiple batteries connected in parallel within a battery circuit to simultaneously charge each of the multiple batteries at different rates, the multiple batteries having disparate charge characteristics;
controlling an adjustable resistance of an adjustable constant current limiter in a charge path of a first battery of the multiple batteries to balance charge between the first battery and a second battery of the multiple batteries when a voltage on a shared battery rail satisfies a first condition; and
selectively enabling a discharge path to support a system load with the first battery when a voltage of the shared battery rail satisfies a second condition, the discharge path bypassing the adjustable constant current limiter and having a total impedance lower than the charge path.

17. The method of claim 16, wherein balancing charge further comprises:
closing a switch to selectively enabling current discharge from the first battery responsive a detected voltage drop on the shared battery rail.

18. The method of claim 16, wherein the battery circuit further includes load source electronics positioned closer to the first battery of the multiple batteries than the second battery of the multiple batteries, the first battery having a lower capacity than the second battery.

* * * * *